United States Patent
Mortensen

[15] 3,649,982
[45] Mar. 21, 1972

[54] ROAD SWEEPER CONVEYOR SYSTEM
[72] Inventor: Donald G. Mortensen, Upland, Calif.
[73] Assignee: Wayne Manufacturing Company, Pomona, Calif.
[22] Filed: Dec. 4, 1969
[21] Appl. No.: 882,143

[52] U.S. Cl. ............................................15/84, 15/86
[51] Int. Cl. ..................................................E01h 1/04
[58] Field of Search ..................15/83, 84; 214/89; 198/9

[56] References Cited

UNITED STATES PATENTS 1,060,506   4/1913   Scroggins..................................15/84

FOREIGN PATENTS OR APPLICATIONS 540,614   5/1957   Canada......................................15/84
501,386   4/1920   France.......................................15/83

Primary Examiner—Edward L. Roberts
Attorney—White & Haefliger

[57] ABSTRACT

Employing the combination of a road sweeping rotary pickup broom, a shrouded conveyor receiving the broom sweepings and a debris receptacle, the invention departs from the conventional practices of conveying the sweepings for delivery into a receptacle forwardly of the conveyor, by carrying the sweepings over the top of the conveyor into a receptacle more conveniently located for dumping at the rear of the vehicle and conveyor system.

2 Claims, 3 Drawing Figures

PATENTED MAR 21 1972
3,649,982
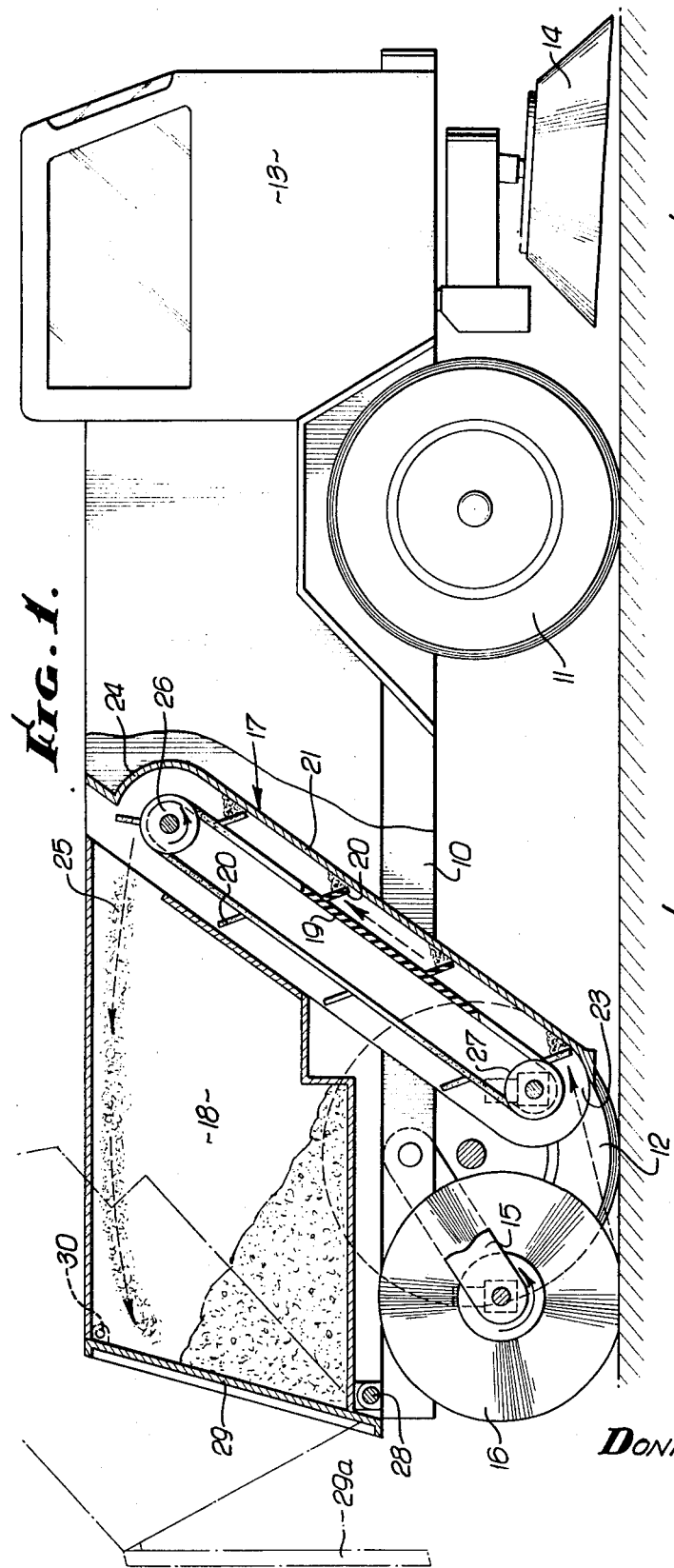
Fig. 1.
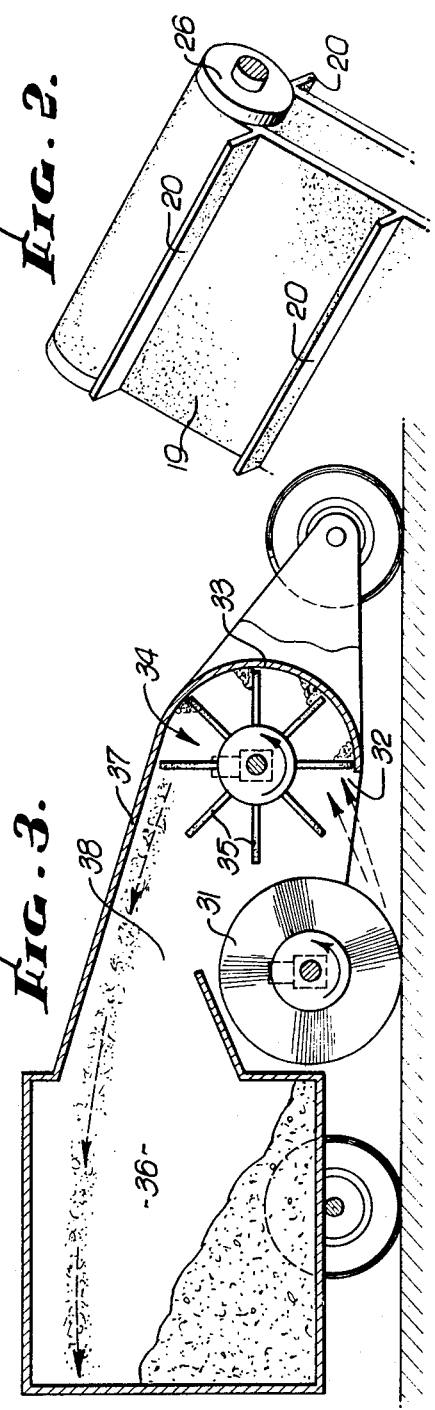
Fig. 2.
Fig. 3.
INVENTOR.
DONALD G. MORTENSEN
BY White & Haefliger
ATTORNEYS.

ROAD SWEEPER CONVEYOR SYSTEM

BACKGROUND OF THE INVENTION

In conventional powered road sweepers employing a rotary pickup broom which projects the swept debris for reception and elevation by a conveyor discharging into a debris chamber, the conveyor and chamber both are positioned forwardly of the broom in the direction of the sweeper travel. In the case of a forwardly inclined conveyor the debris discharge is laterally from the conveyor housing or shroud into the forward debris chamber.

By reason of its forward location, dumping of the debris chamber has involved mechanical requirements and operational inconveniences that are avoided by the present conveyor system permitting rearward location of the chamber and its dumping much in the manner of a dump truck.

SUMMARY OF THE INVENTION

The invention has for its general object to adapt the conveyor to what may be termed overthrow operation by which the conveyed debris is carried over the top of the conveyor and projected rearwardly into the debris chamber, the debris trajectory within the chamber being variable in accordance with the conveyor speed.

Structurally the invention contemplates extension of the conveyor housing about the top of the conveyor to an extent sufficient for direction of the debris in desired trajectory into the debris chamber.

The details of illustrative embodiments of the invention will be apparent from the following description of the accompanying drawing:

BRIEF DESCRIPTION OF THE DRAWING

FIG. 1 illustrates in side elevation a four wheel road sweeper embodying the invention as particularly shown in cross section;

FIG. 2 is a fragmentary perspective showing the conveyor belt and top supporting roller above which the overthrow occurs; and FIG. 3 is a view showing diagrammatically the pickup broom, conveyor and dirt hopper in a variational form of the invention without inclusion of chassis details as shown in FIG. 1.

DESCRIPTION OF THE PREFERRED EMBODIMENTS

In reference first to FIG. 1, the sweeper vehicle is shown to comprise a frame structure 10, forward and rear wheels 11 and 12 with a conventional cab 13 and gutter broom 14. At the rear the frame mounts as by pivoted arms 15 a pickup broom 16 which is power driven for rotation in the direction of the arrow.

The invention is primarily concerned with the structures appearing in cross section and the combination and relation of the conveyor generally indicated at 17 and the debris chamber 18. The conveyor 17 may be of a usual type to the extent of its inclusion of an endless belt 19 carrying flexible squeegees 20 traveling within the illustrated housing and engaging the inside of forward section 21 of the housing.

As previously indicated the conventional practice has been to locate the debris chamber forwardly of the conveyor so that the latter discharges elevated debris forwardly into the chamber. In contrast, the present conveyor housing or shroud 21 into which debris projected by broom 16 is received at 23, is extended at 24 over the top of the conveyor, substantially as illustrated, to provide for rearward discharge of the debris at 25 into chamber 18. Traveling about the upper and lower rotating carriers 26 and 27 the conveyor may be driven at speeds sufficiently great that the debris is projected by the squeegees toward the rear of the debris chamber thus to facilitate progressive forward filling. As illustrated by the broken lines in FIG. 1 the chamber 18 is of a rear dump type, being mounted for bodily tilting about shaft 28 and having a dump door 29 hinged at 30 to the top of the chamber so as to be openable as indicated at 29a to dump the debris load.

FIG. 3 illustrates a variational form of the invention as embodied typically in a three-wheel road sweeper in which the essential components with which the invention is concerned include the power driven pickup broom 31 discharging its sweepings at 32 into an arcuate housing 33 containing an essentially circular conveyor generally indicated at 34 and being power driven as indicated by the arrow. The conveyor 34 has radial flexible squeegees 35 operating in engagement with the housing 33 to the extent illustrated and in the manner of squeegees 20 to receive between them and project rearwardly the debris received pickup broom.

The housing section 33 may be continued rearwardly in any suitable manner for direction of the debris from over the top of the conveyor into the debris chamber 36. As illustrative, the arcuate housing extent 33 may be continued at 37 in overlying relation to the broom 31 to direct the debris through opening 38 into chamber 36. As will be understood without necessity for specific illustrations, the debris chamber may be mounted or accommodated for rear dumping in any suitable manner.

I claim:

1. In a vehicle road sweeper including a rotary pickup broom, a conveyor system comprising a power driven endless conveyor positioned forwardly of the broom to receive sweepings projected therefrom, the conveyor being elongated and extending upwardly and forwardly away from the region over the broom, a shroud extending about the lower forward portion of the conveyor and then inclined upwardly and forwardly beneath and parallel to the conveyor to a discharge location overlying the top of the conveyor at which location the shroud has rearwardly directed curvature, and a debris dumping receptacle carried by the vehicle at the rear of the conveyor and shroud and above the level of the broom, the receptacle opening forwardly toward said location, the conveyor including an endless flexible carrier for spaced shroud squeegees operating to elevate sweepings along the bottom interior upwardly and forwardly sloping surface of the shroud for accelerated rearward overthrow at the top of conveyor, with rearward velocity sufficient to carry the sweepings to the rear of the receptacle.

2. A conveyor system according to claim 1 in which there is a pivoted connection through which the receptacle is supported for rearward pivoting about a generally horizontal axis defined by said connection.

* * * * *